(12) United States Patent
Jin et al.

(10) Patent No.: US 8,327,394 B2
(45) Date of Patent: Dec. 4, 2012

(54) BOOSTING FACTOR FOR TELEVISION CONTENT

(75) Inventors: Zhiying Jin, Lexington, MA (US); Haiyan Zhou, Waltham, MA (US); Shuai Wu, Waltham, MA (US); Wenjie Liu, Wayland, MA (US); Haosheng Guo, Nashua, NH (US); Juhong Liu, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 470 days.

(21) Appl. No.: 12/627,524

(22) Filed: Nov. 30, 2009

(65) Prior Publication Data
US 2011/0131594 A1    Jun. 2, 2011

(51) Int. Cl.
*H04H 60/33* (2008.01)
(52) U.S. Cl. .......................................................... 725/9
(58) Field of Classification Search ................. 725/9
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |

(Continued)

*Primary Examiner* — Dominic D Saltarelli

(57) ABSTRACT

A method includes receiving viewership data associated with television contents; calculating one or more local boosting factors and a national boosting factor for each of the television contents based on the viewership data; applying boosting factor assignment heuristics to the one or more local and national boosting factors for each of the television contents; selecting one or more boosting factors based the applying of the boosting factor assignment heuristics for each of the television contents; and publishing the one or more boosting factors to one or more television distribution sites for each of the television contents.

18 Claims, 9 Drawing Sheets

U.S. PATENT DOCUMENTS

| | | |
|---|---|---|
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,487,529 B1 | 2/2009 | Orlick |
| 8,006,259 B2 * | 8/2011 | Drake et al. .................. 725/13 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2010/0125351 A1 * | 5/2010 | Davydov ..................... 700/94 |

* cited by examiner

BOOSTING FACTOR FOR TELEVISION CONTENT

BACKGROUND

In today's television content distribution systems, customers are provided an expansive array of television content. Given the overwhelming amount of television content available to customers, service providers and/or network operators are confronted with various challenges relating to television content distribution. For example, service providers and/or network operators may manage large amounts of television content transfers, as well as deal with time constraints, distribution issues, resource constraints, etc., associated with television content distribution.

DETAILED DESCRIPTION OF PREFERRED EMBODIMENTS

Figure 1A:
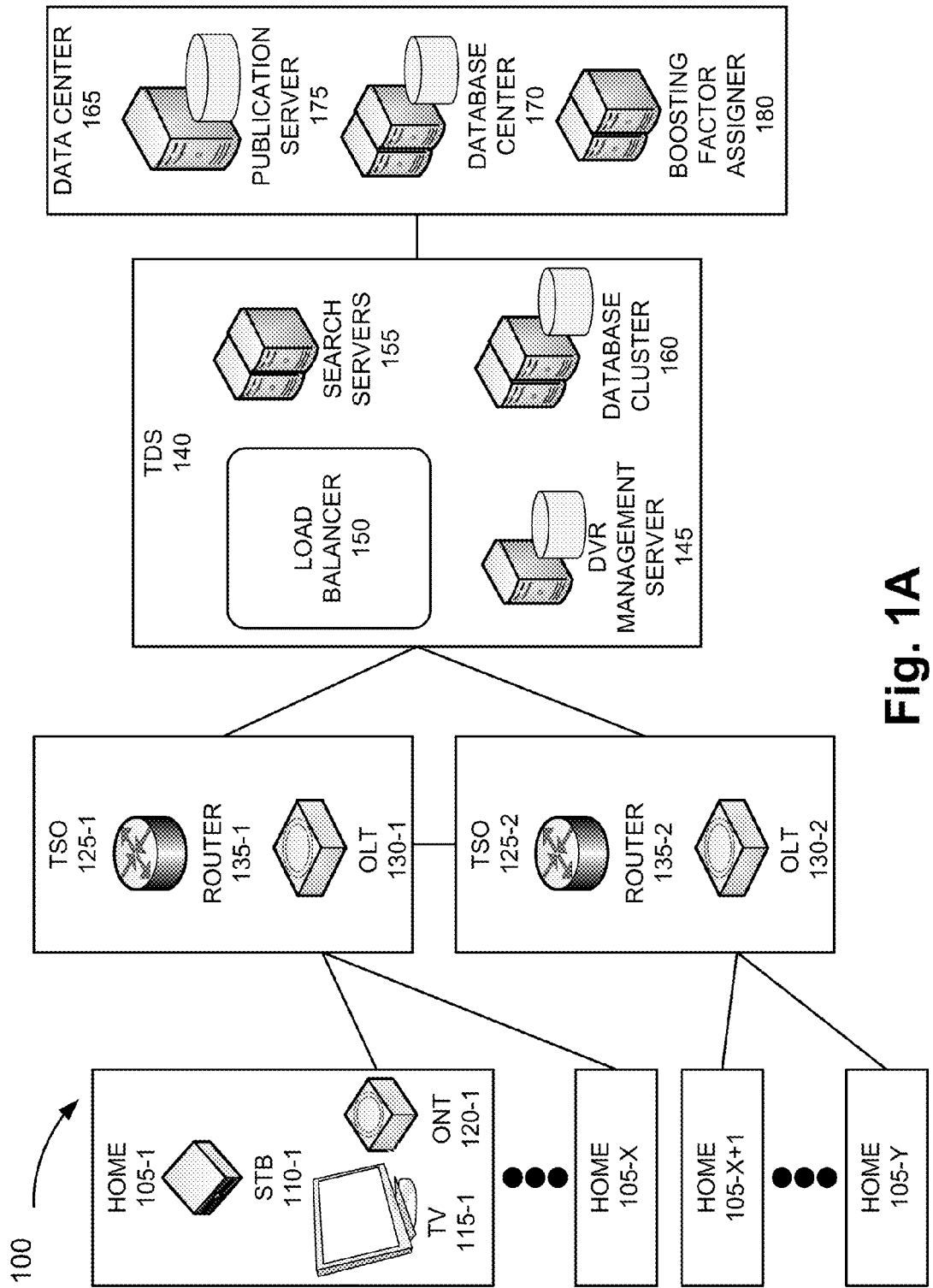
FIG. 1A is a diagram illustrating an exemplary environment that includes a television content distribution system that may assign boosting factors to television content.

The following detailed description refers to the accompanying drawings. The same reference numbers in different drawings may identify the same or similar elements. Also, the following detailed description does not limit the invention.

The term "television content," as used herein, may include content displayable on a television or other form of a display. For example, television content may include television shows, movies, documentaries, sports, news, on-demand television, pay-per-view programming, local programming, national programming, premium channels, podcasts, and/or other types of content (e.g., television guides, free programming, free events, games, etc.). In an exemplary implementation, television content may be delivered via a television distribution system.

The term "boosting factor," as used herein, may include a value representing a level of importance of television content relative to other television content. The boosting factor may have a value within a predetermined numerical range (e.g., 1-100). In an exemplary implementation, the boosting factor may be calculated based on viewership data (e.g., local viewership data, national viewership data, etc.) associated with the television content in which local boosting factors and/or a national boosting factor may be derived. Additionally, or alternatively, the boosting factor may be manually assigned (e.g., by a television network administrator).

As will be described herein, a television content distribution system may assign a boosting factor to television content. The boosting factor may be used as a determinant in which television content may be presented to customers, for example, when customers are browsing, searching, etc., for television content. By way of example, but not limited thereto, television content assigned a higher boosting factor may be presented to a customer before (e.g., in terms of time, in terms of order (e.g., in a list, within a category, etc.), etc.) television content assigned a lower boosting factor.

As previously described, a boosting factor may be calculated based on viewership data and/or may be manually assigned. In an exemplary implementation, geographic boosting factors (e.g., local, national) corresponding to geographic viewership (e.g., local, national) may be utilized to calculate the boosting factor. In an exemplary implementation, boosting factor assignment heuristics may be utilized to select an appropriate boosting factor based on the geographic boosting factors. As will be described in greater detail below, the boosting factor assignment heuristics may utilize a relationship between a maximum local boosting factor value and a national boosting factor value to determine the boosting factor for particular television content. Given the time and resources needed to generate and publish boosting factors for television content, the boosting factor assignment heuristics may minimize overhead and resource utilization by assigning the same boosting factor for particular television content in different television distribution site regions.

FIG. 1A is a diagram illustrating an exemplary environment 100 that may include a television content distribution system that may assign boosting factors to television content. As illustrated in FIG. 1A, exemplary environment 100 may include homes 105-1 through 105-Y (referred to generally as home 105 or homes 105). Home 105 may include a set top box 110, a television (TV) 115, and an optical network termination unit (ONT) 120. Environment 100 may include television serving offices (TSOs) 125-1 and 125-2 (referred to generally as TSO 125 or TSOs 125). TSO 125 may include an optical line termination unit (OLT) 130 and a router 135. Environment 100 may include a television distribution site (TDS) 140 that includes a DVR management server 145, a load balancer 150, search servers 155, and a database (DB) cluster 160. Environment 100 may also include a data center 165 that includes a database center 170, a publication server 175, and a boosting factor assigner 180.

Home 105 may correspond to a customer site. As illustrated, home 105 may include exemplary customer premise equipment, such as, for example, set top box 110, TV 115, and ONT 120. Set top box 110 may include a device to provide television content to TV 115. Set top box 110 may include a DVR and/or a DVR client. TV 115 may include a device to display television content to a customer. ONT 120 may include a device that provides an interface between an optical distribution network and the customer site. For example, ONT 120 may provide an interface between home 105 and TSO 125.

TSO 125 may correspond to an intermediary television distribution site between home 105 and TDS 140. As illustrated, TSO 125 may include exemplary television distribution devices, such as, for example, OLT 130 and router 135. OLT 130 may include a device that serves as a point of origination for fiber-to-the-premises (FTTP) transmissions coming into and out of TDS 140. Router 135 may include a device that routes television content.

TDS 140 may correspond to a television distribution site. As illustrated, TDS 140 may include exemplary television distribution devices, such as, for example, a DVR management server 145, load balancer 150, search servers 155 and DB cluster 160. "Television distribution device," as used herein, is intended to be broadly interpreted to include a device that, for example, facilitates the delivery of television content. DVR management server 145 may include a device that manages the recording of television content between customers' DVRs. Load balancer 150 may include a device that manages a load (e.g., the provisioning and delivering of television content to customers) among search servers 155. Load balancer 150 may distribute the processing load associated with delivering television content among search servers 155 in an equally distributed fashion. Search servers 155 may include devices that deliver television content to customers. DB cluster 160 may include a device that stores various types of data, such as, for example, an interactive programming guide (IPG), set top box configuration data, and/or customer profile data.

Data center 165 may correspond to a television distribution site that receives and manages television content. As illustrated, data center 165 may include exemplary television distribution devices, such as, for example, database center 170, publication server 175, and a boosting factor assigner 180. Database center 170 may include a device that stores television content. For example, a television service provider may receive and/or generate updated television content and store the updated television content in database center 170. Publication server 175 may include a device that publishes or pushes the updated television content stored in database center 170 to TDS 140. Boosting factor assigner 180 may include a device that assigns boosting factors to television content.

Figure 1B:
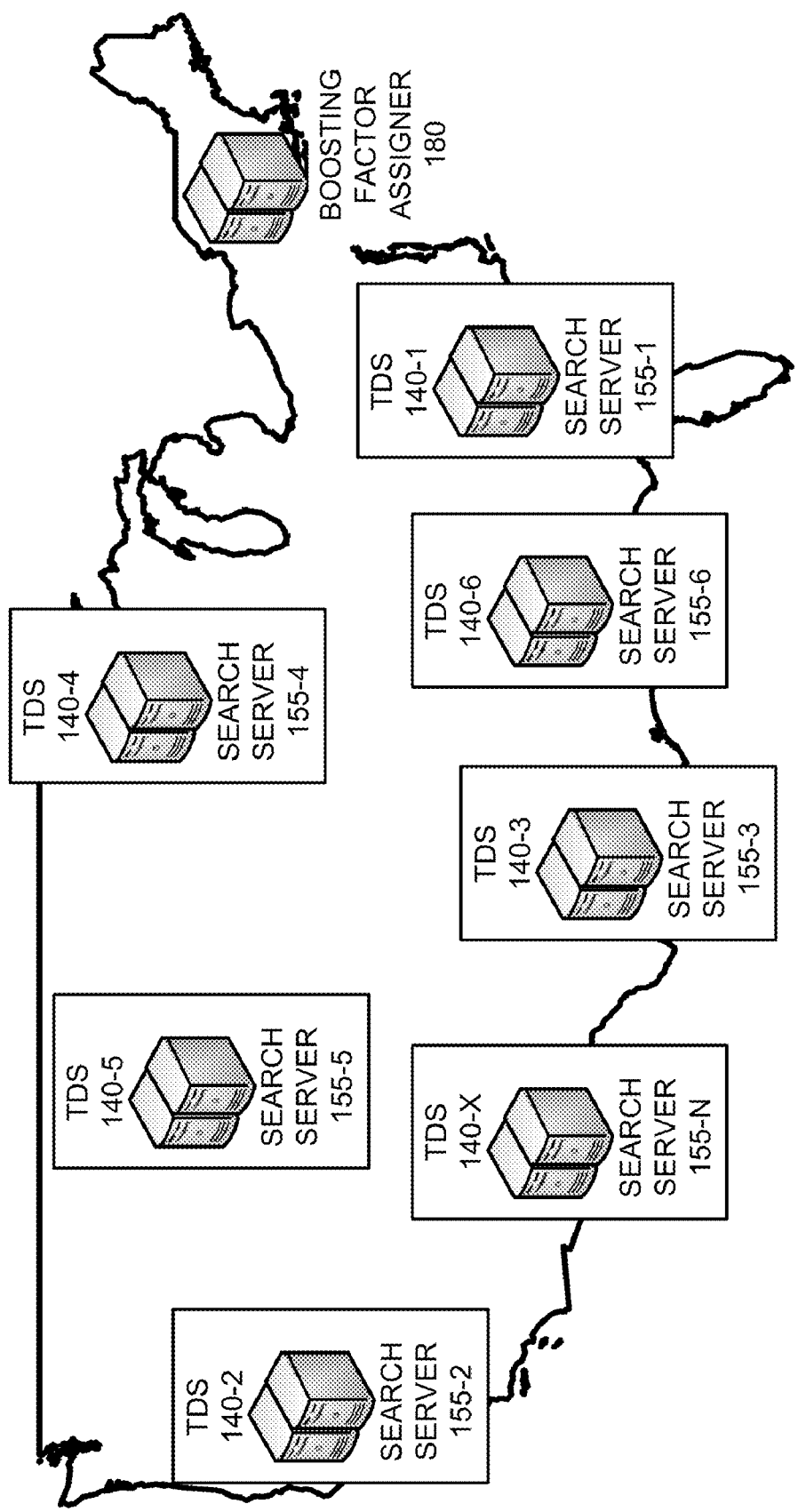
FIGS. 1B and 1C are diagrams illustrating an exemplary implementation for assigning boosting factors to television content.
Figure 1C:
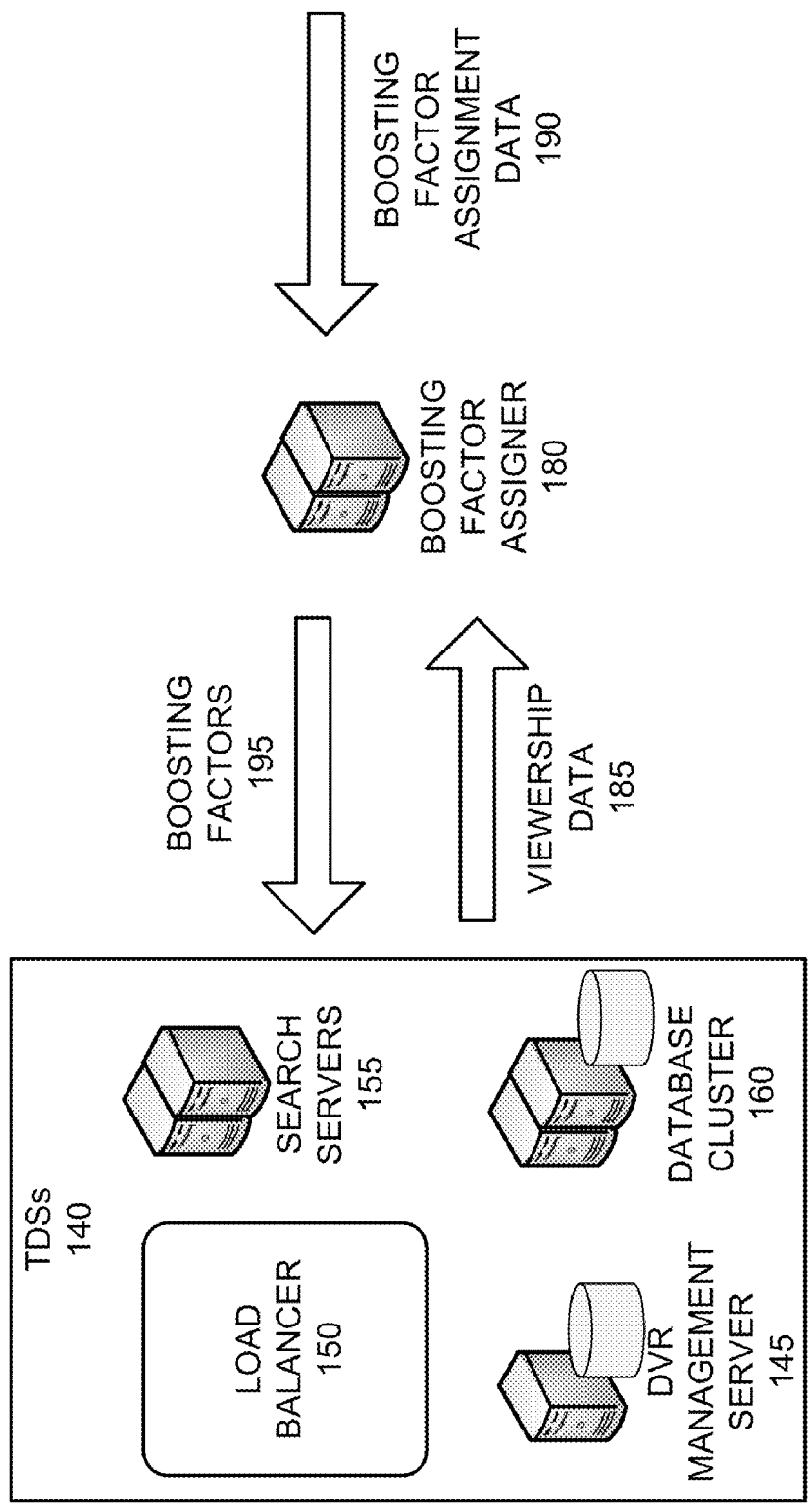

FIGS. 1B and 1C are diagrams illustrating an exemplary implementation for assigning boosting factors to television content. FIG. 1B illustrates an exemplary television distribution system. For example, TDSs 140-1 through 140-X (where X>1) (referred to generally as TDS 140 or TDSs 140) may be located in various places in the United States. Additionally, a boosting factor assigner 180 may be located in the United States.

Referring to FIG. 1C, boosting factor assigner 180 may be provided viewership information 185. For example, each TDS 140 may provide local viewership data associated with television content to boosting factor assigner 180. Boosting factor assigner 180 may compile national viewership data based on the local viewership data. Viewership data 185 may include the local viewership data and/or the national viewership data.

Additionally, or alternatively, boosting factor assigner 180 may be provided with boosting factor assignment data 190. Boosting factor assignment data 190 may include boosting factors to be assigned to television content. For example, a television distribution administrator may provide boosting factor assignment data 190 to boosting factor assigner 180 via a web interface or some other type of interface. In some instances, the television distribution administrator may formulate the boosting factor based on data provided by a third party (e.g., television content provider). For example, the television content provider may be introducing a new television show in which case a boosting factor may be manually assigned by the television distribution administrator.

Boosting factor assigner 180 may calculate boosting factors for television content based on viewership data 185. In an exemplary implementation, boosting factor assigner 180 may determine the number of television content (e.g., the number of television programs) (N), a maximum value of viewership (Max) of television content, and a minimum value of viewership (Min) of television content. Boosting factor assigner 180 may determine (N), (Max), and (Min) for each of the local viewership data associated with TDSs 140-1 through 140-X, and the national viewership data included in viewership data 185. Boosting factor assigner 180 may then utilize the following exemplary expression:

$$\frac{(i-1)}{(N-1)} * (\text{Max} - \text{Min}) + (\text{Min}) = \text{factor},$$

to compute local boosting factors and a national boosting factor. In this exemplary expression, (i) may represent a numerical ranking for the particular television content relative to the other television content, in which the ranking is based on viewership. For example, if N=200 (e.g., 200 television programs), (i) may have a value between 1 through 200. That is, if the particular television content was the most watched television content, the particular television content may be assigned i=200, if the least watched television content, i=1, etc. Based on the above, boosting factor assigner 180 may calculate X number of local boosting factors (e.g., {10, 10, 11 ... 13}) in correspondence to X number of TDSs 140 (assuming the particular television content was watched by customers in each of TDSs 140-1 through 140-X), and a national boosting factor (e.g., {15}).

Boosting factor assigner 180 may then apply boosting factor assignment heuristics in view of the local and national boosting factors to assign a boosting factor to the particular television content. For example, if a maximum value of the local boosting factors is greater than three times the national boosting factor, then the respective local boosting factors may be assigned as the boosting factor for the particular television content in each TDS 140. On the other hand, if a maximum value of the local boosting factors is less than or equal to three times the national boosting factor, then the national boosting factor may be assigned as the boosting factor for the particular content in each TDS 140.

Referring to FIGS. 1B and 1C, boosting factor assigner 180 may publish boosting factors 195 to TDSs 140. For example, boosting factor assigner 180 may publish boosting factors 195 via publication server 175 or directly to TDSs 140. In instances when the national boosting factor may be assigned and published as the boosting factor between TDSs 140 (i.e., the same boosting factor between TDSs 140 for the particular television content), resource utilization, time, overhead, etc., may be significantly minimized during publication. This is in contrast to when the local boosting factors may be assigned and published, respectively, as the boosting factor between TDSs 140 (i.e., where different boosting factors between TDSs 140 for the particular content) such that indexing processes, indexing data, publication, etc., may be significantly greater that publishing a single national boosting value. Thus, despite differences that may exist between local boosting factors associated with the particular television content, these differences may be managed in a manner that may minimize resource utilization, time, overhead, etc., associated with publication.

TDSs 140 may apply boosting factors 195 to television content. In this way, when customers search for television content via an interface, the television content may be presented to customers based on boosting factors 195 associated with the television content. For example, as previously described, television content assigned a higher boosting factor 195 (e.g., 100) may be presented to a customer before (e.g., in terms of time, in terms of order (e.g., in a list, within a category, etc.), etc.) television content assigned a lower boosting factor 195 (e.g., 10).

As a result of the foregoing, resource utilization, time, overhead, etc., may be significantly minimized in a television distribution system when applying the boosting factor assignment heuristics described herein. Additionally, or alternatively, television content, which may or may not be considered equally important to customers associated with different television distribution sites (e.g., different TDSs 140), may be presented to the customers according to boosting factors representing an importance of the television content to those customers. For example, Boston Red Sox games may be assigned a higher boosting factor in the Boston region compared to White Sox games. Conversely, White Sox games may be assigned a higher boosting factor in the Chicago region compared to Boston Red Sox games. This may be useful given the amount of television content available to the customer vis-à-vis the limited display screen area of TV 115. Since the exemplary implementation has been broadly described, a more detailed description is provided below.

Figure 2:
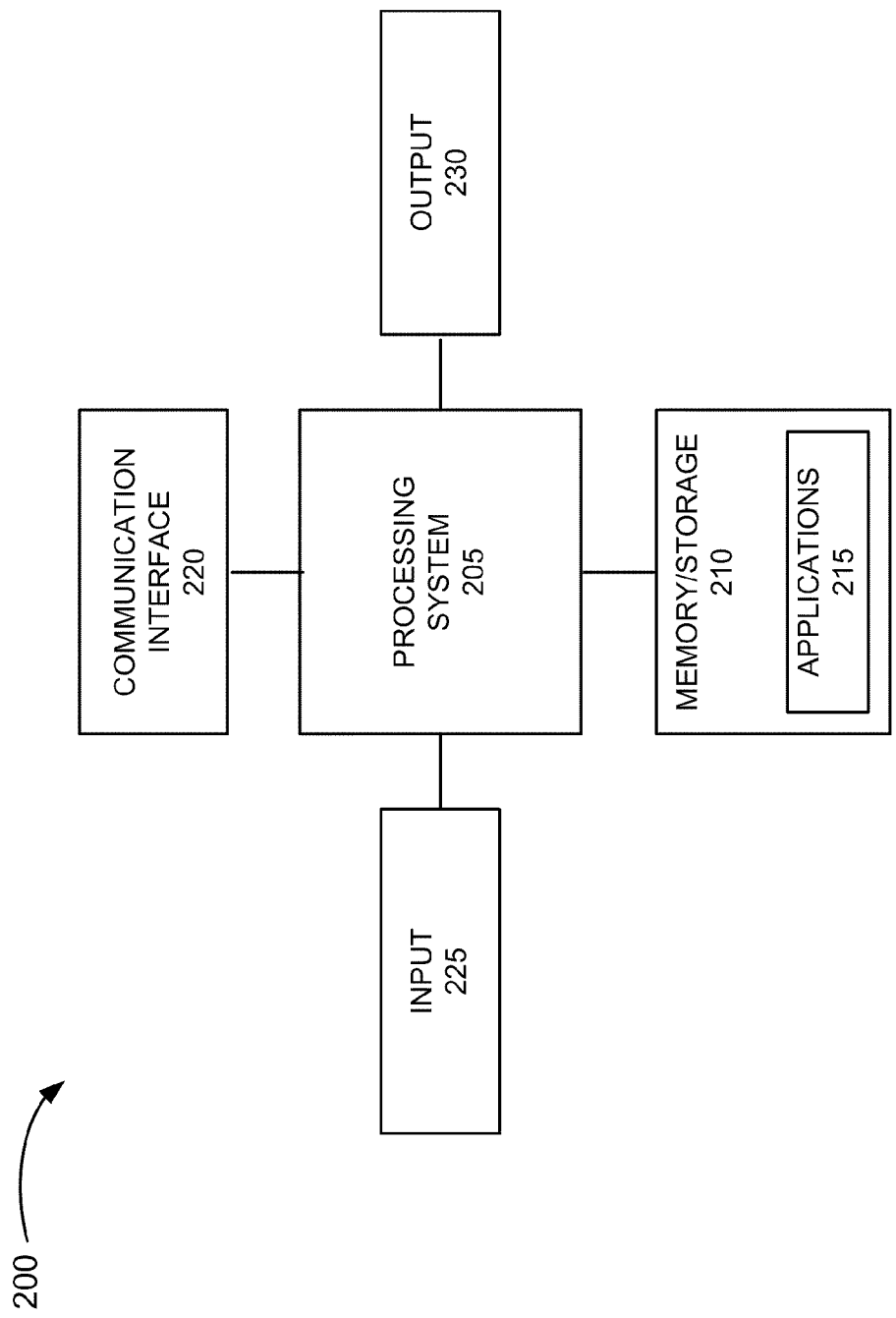
FIG. 2 is a diagram illustrating exemplary components of a device that may correspond to one or more of the devices in the exemplary environment of FIG. 1A.

FIG. 2 is a diagram illustrating exemplary components of device 200 that may correspond to one or more of the devices in environment 100. For example, device 200 may correspond to search servers 155, publication server 175, boosting factor assigner 180, as well as other devices (e.g., set top box 110, etc.) in environment 100. As illustrated, device 200 may include a processing system 205, memory/storage 210 including applications 215, a communication interface 220, an input 225, and an output 230. In implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to correspond to, for example, a memory, a storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200. For example, applications 215 may include one or more applications to calculate boosting factors and/or information used to calculate boosting factors.

Communication interface 220 may permit device 200 to communicate with other devices, networks, systems and/or the like. For example, communication interface 220 may include a cable interface, a fiber optic interface, a radio interface, and/or some other type of wireless interface and/or wired interface.

Input 225 may permit a user and/or another component or device to input information into device 200. For example, input 225 may include a keyboard, a keypad, a display, a touchpad, a mouse, a button, a switch, a microphone, an input port, a drive, voice recognition logic, and/or some other type of visual, auditory, and/or tactile input component. Output 230 may permit device 200 to output information from device 200 (e.g., to a user and/or to another component or device). For example, output 230 may include a display, a speaker, light emitting diodes (LEDs), an output port, and/or some other type of visual, auditory, and/or tactile output component.

As described herein, device 200 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3:
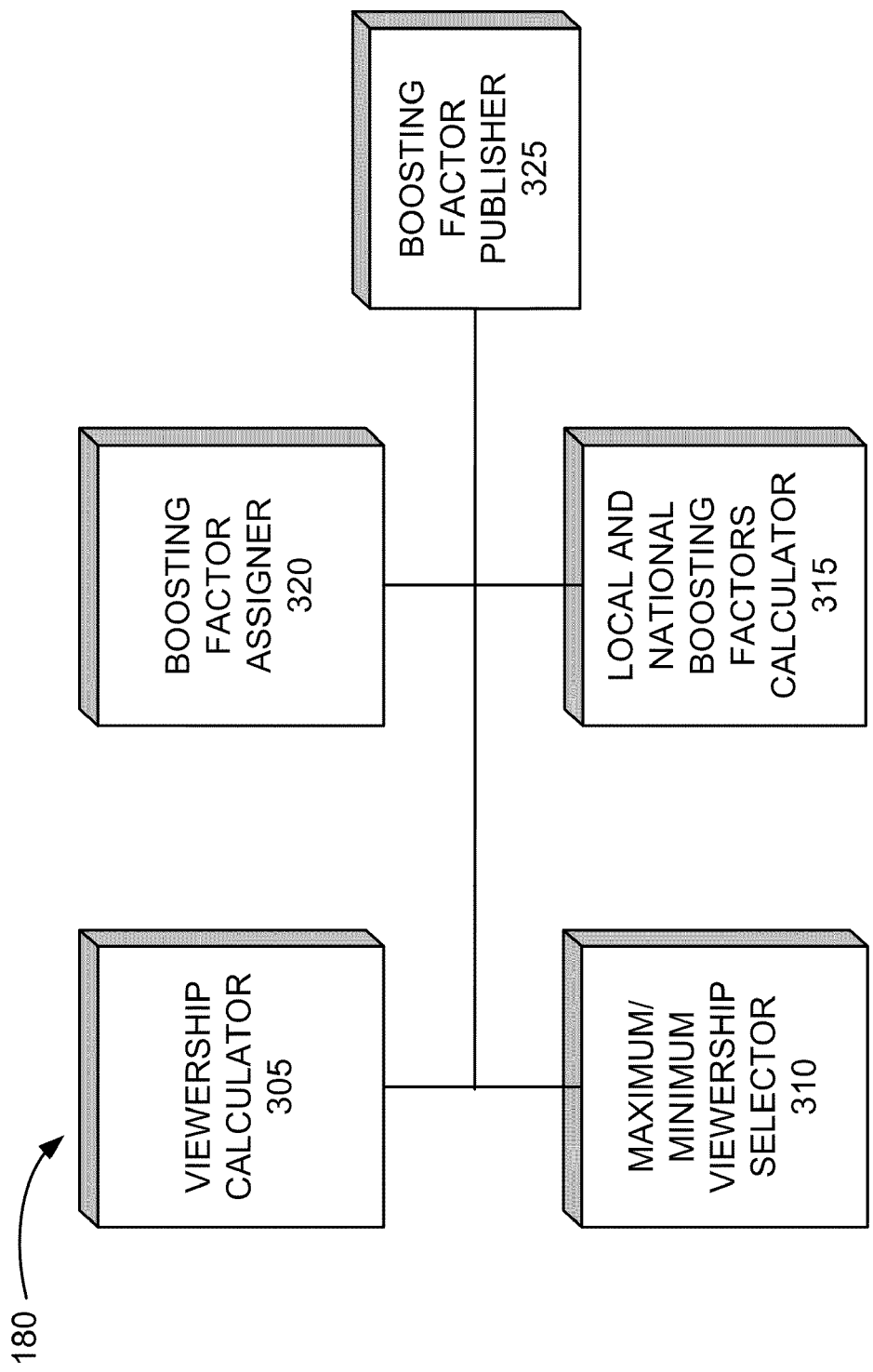
FIG. 3 is a diagram illustrating exemplary functional components associated with a boosting factor assigner.

FIG. 3 is a diagram illustrating exemplary functional components associated with boosting factor assigner 180. As illustrated in FIG. 3, boosting factor assigner 180 may include a viewership calculator (VC) 305, a maximum and minimum viewership selector (MMVS) 310, a local and national boosting factors calculator (LNBF) 315, a boosting factor assigner (BFA) 320, and a boosting factor publisher (BFP) 325. VC 305, MMVS 310, LNBF 315, BFA 320, and/or BFP 325 may be implemented as a combination of hardware (e.g., processing system 205, etc.) and software (e.g., applications 215, etc.) based on the components illustrated and described with respect to FIG. 2. Alternatively, VC 305, MMVS 310, LNBF 315, BFA 320, and/or BFP 325 may be implemented as hardware based on the components illustrated and described with respect to FIG. 2.

Boosting factor assigner 180 may calculate boosting factors for television contents. In an exemplary implementation, boosting factor assigner 180 may calculate numerous local boosting factors and a national boosting factor. In an exemplary case, assume a television content W aired and was watched by customers in each TDS 140. Boosting factor assigner 180 may calculate X+1 boosting factors corresponding to X number of local boosting factors (associated with TDSs 140-1 through TDS 140-X) and one national boosting factor for the television content W.

VC 305 may calculate (N). As previously described, (N) may represent the total number of television contents watched by customers. For example, if in TDS 140-1, 510 television contents were watched by customers, then N=510. When calculating the national boosting factor, (N) may represent the total number of television contents aired and watched by customers on a national level. The value of (N) may be the same or may be different between TDSs 140.

MMVS 310 may select (Max) and (Min) values. As previously described, (Max) may represent a maximum viewership of television content within the local viewership data and the national viewership data, respectively, and (Min) may represent a minimum viewership of television content within the local viewership data and the national viewership data, respectively. For example, if in TDS 140-1, the most watched television content Z had 50,000 customer viewers, then (Max) may have a value of 50,000, and if in TDS 140-1, the least watched television content X had 1,000 customer viewers, then (Min) may have a value of 1,000. It will be appreciated that in some instances, television content W may be selected for (Max) or (Min) values.

LNBF 315 may calculate factor. For example, as described above, a boosting factor may be calculated according to the following exemplary expression:

$$\frac{(i-1)}{(N-1)} *(\text{Max} - \text{Min}) + (\text{Min}) = \text{factor}. \quad (1)$$

In this exemplary expression, (i) may represent a numerical ranking for the particular television content (e.g., television content W) relative to the other television content. For example, if N=510 (e.g., 510 television contents), (i) may have a value between 1 through 510. The numerical ranking may be based on the viewership associated with television content W relative to the other television content. Once the variable factor is calculated, the boosting factor may be calculated according to the following exemplary expression:

$$\text{Math.floor(factor+0.5)=boosting\_factor}. \quad (2)$$

In exemplary implementation, the function Math floor may round down (factor+0.5) to the nearest integer. For example, if factor=1.25, adding 0.5 provides Math.floor (1.25+0.5) =1.00. In other implementations, Math.floor may round up (factor+0.5) to the nearest integer. For example, if factor=1.25, adding 0.5 provides Math.floor (1.25+0.5)=2.00.

BFA 320 may assign boosting factors to television content based on the boosting factor assignment heuristics. In an exemplary implementation, the assignment of the boosting factor to television content may be based on differences between the national boosting factor and the local boosting factors. That is, the assignment may include selecting the national boosting factor as the boosting factor or the local boosting factors as the boosting factors for various regions based on the following boosting factor assignment heuristics.

For example, if the maximum of the local boosting factors is greater than three times the national boosting factor, then the respective local boosting factors may be assigned to its corresponding region (e.g., each TDS 140) as the boosting factor. By way of example, assume that for the television content W, six regions have local boosting factors of {3, 4, 5, 6, 7, 30}, respectively, and the national boosting factor is 9. Since the maximum of the local boosting factors is 30, and 30 is greater than three times the national boosting factor 9, the local boosting factors {3, 4, 5, 6, 7, 30} may be assigned to the six regions, respectively, as the boosting factor.

On the other hand, if the maximum of the local boosting factors is less than or equal to three times the national boosting factor, then the national boosting factor may be assigned to each region (e.g., each TDS 140) as the boosting factor. By way of example, assume that for the television content W, six regions have local boosting factors of {3, 4, 5, 6, 7, 8} and the national boosting factor is {7}. Since the maximum of the local boosting factors is 8, and 8 is less than three times the national boosting factor 7, the national boosting factor 7 may be assigned to each of the six regions as the boosting factor (i.e., {7, 7, 7, 7, 7, 7}). BFA 320 may select the boosting factors for television contents based on results of the applied boosting factor assignment heuristics. It will be appreciated that in other implementations, the mathematical relationship between maximum local boosting factors and the national boosting factor may be a value other than three times.

BFP 325 may publish boosting factors 195 to TDSs 140. For example, boosting factor assigner 180 may publish boosting factors 195 via publication server 175 or directly to TDSs 140. In an exemplary implementation, TDSs 140 may obtain boosting factors 195 on a regular basis (e.g., daily or weekly, etc.). Based on the boosting factor assignment heuristics described herein, publication of boosting factors to different regions may be minimized. For example, boosting factors {3, 4, 5, 6, 7, 8} between the six regions are not significantly different in value from the national boosting factor. In such instances, assigning the same boosting factor for each region may significantly reduce resource utilization, time, overhead, etc. associated with publication of the six boosting factors, which is in contrast to when the six regions may be assigned distinct boosting values and these six distinct boosting values are published.

Although FIG. 3 illustrates exemplary functional components of boosting factor assigner 180, in other implementations, boosting factor assigner 180 may include fewer functional components, additional functional components, different functional components, and/or a different arrangement of functional components than those illustrated in FIG. 3 and described. Additionally, or alternatively, one or more operations described as being performed by a particular functional component may be performed by one or more other functional components, in addition to or instead of the particular functional component.

Figure 4:
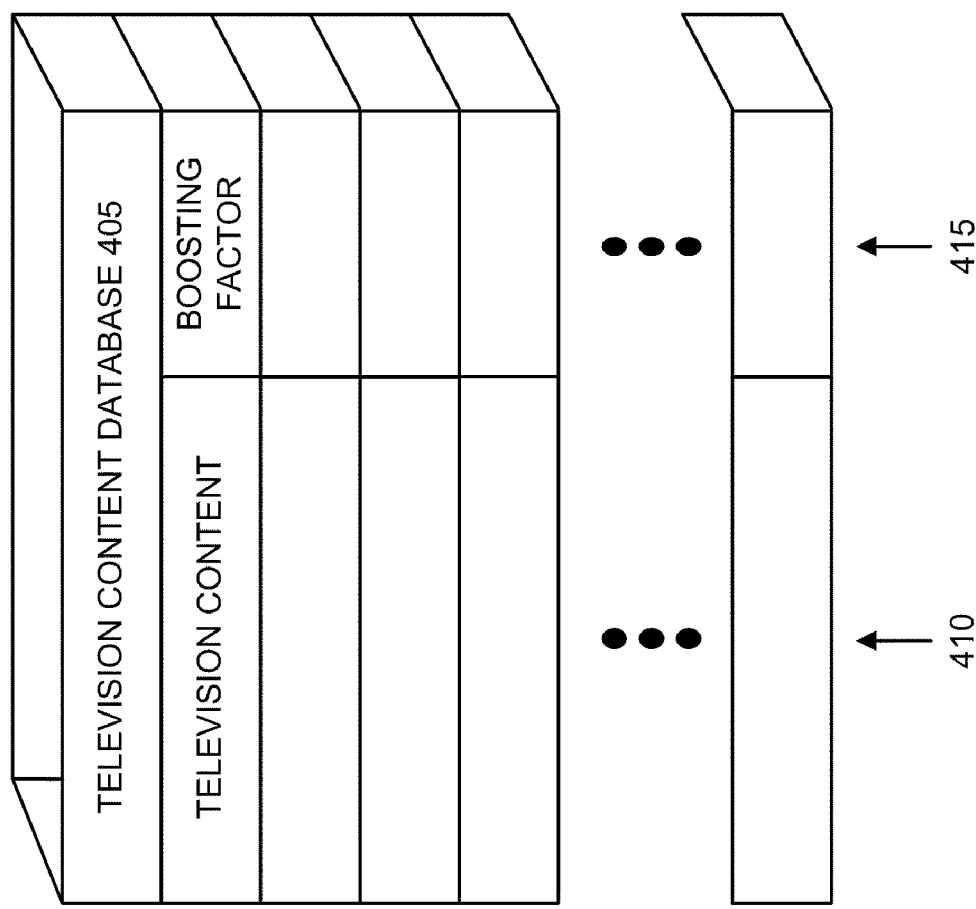
FIG. 4 is a diagram illustrating an exemplary television content database.

FIG. 4 is a diagram illustrating an exemplary television content database 405. In an exemplary implementation, one or more devices in TDS 140 may store television content database 405 based on the published boosting factors from boosting factor assigner 180. For example, television content database 405 may be stored by at least one of search servers 155, database cluster 160, or DVR management server 145.

In an exemplary implementation, television content database 405 may include a television content field 410 and a boosting factor field 415. In other implementations, television content database 405 may include additional database fields and/or different database fields.

Television content field 410 may include information identifying a particular television content. For example, television content field 410 may include the name of the television content (e.g., "Boston Legal") or some other type of identifier. Boosting factor field 415 may include a corresponding boosting factor associated with the particular content. For example, boosting factor field may include a numerical value (e.g., 0-100). As previously described, the boosting factor may be used as a determinant in which television content may be presented to customers, for example, when customers are browsing, searching, etc., for television content.

Figure 5:
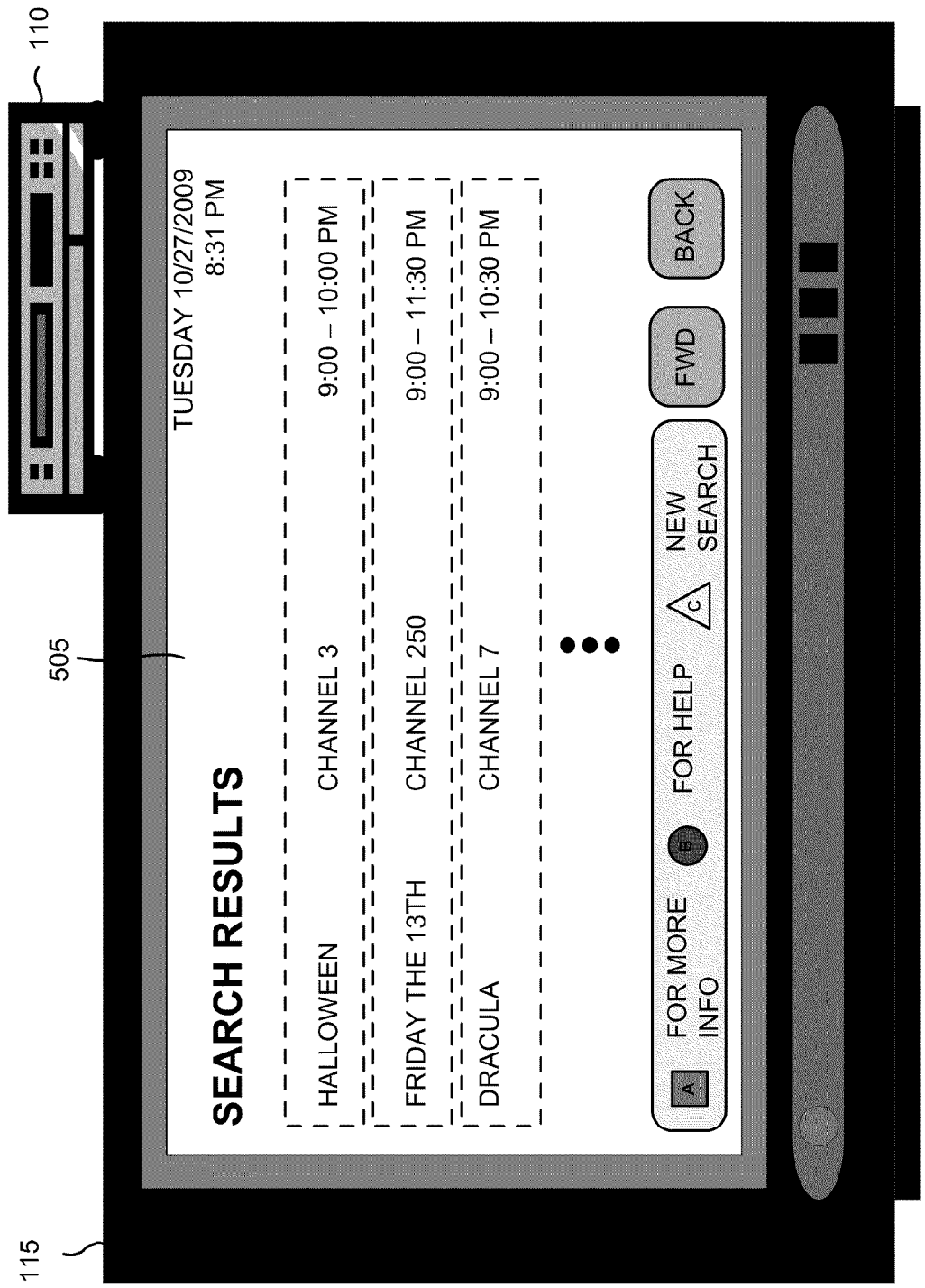
FIG. 5 is a diagram illustrating an exemplary graphical user interface (GUI) displayed on a TV via a set top box.

FIG. 5 is a diagram illustrating an exemplary graphical user interface (GUI) 505 displayed on TV 115 via set top box 110. GUI 505 may correspond to an interactive application 215, associated with set top box 110, which permits a customer to search television content. For example, assume the customer initiated a search for horror movies since it is near the Halloween season. In this example, the search results include a list of television content that is identified according to boosting factors. For example, the first listing (i.e., "Halloween") may be the television content having the highest boosting factor that matches the search query.

Figure 6:
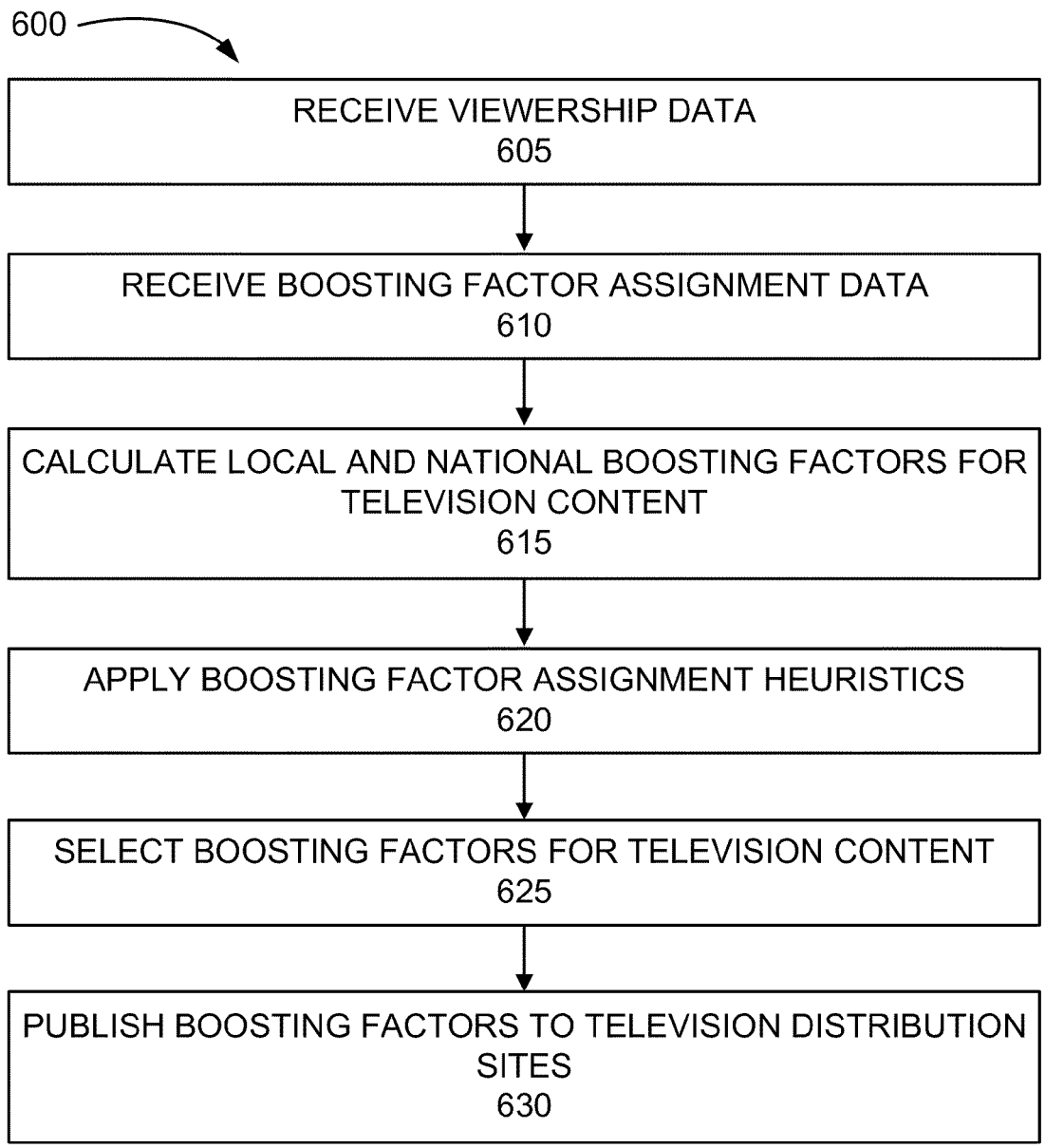
FIG. 6 illustrates a flow diagram of an exemplary process for assigning boosting factors to television content and publishing the boosting factors to television distribution sites.

FIG. 6 illustrates a flow diagram of an exemplary process 600 for assigning boosting factors to television content and publishing the boosting factors to television distribution sites.

In an exemplary implementation, process 600 may be performed by boosting factor assigner 180.

Process 600 may include receiving viewership data (block 605). For example, boosting factor assigner 180 may receive local viewership data from TDSs 140. Boosting factor assigner 180 may compile national viewership data based on the local viewership data. Viewership data 185 may include the local viewership data and/or the national viewership data.

Boosting factor assignment data may be received (block 610). For example, a television distribution administrator may provide boosting factor assignment data 190 to boosting factor assigner 180 via a web interface or some other type of interface. Boosting factor assignment data 190 may include boosting factors for television content. In an exemplary implementation, boosting factor assignment data 190 may overwrite boosting factors calculated based on viewership data 185.

Local and national boosting factors for television content may be calculated (block 615). For example, boosting factor assigner 180 may calculate local and national boosting factors. In an exemplary implementation, the local and national boosting factors may be calculated based on expressions (1) and (2) above, which is described in more detail with respect to FIG. 7 below.

Boosting factor assignment heuristics may be applied (block 620). For example, BFA 320 may assign boosting factors to television content based on the boosting factor assignment heuristics. In an exemplary implementation, the assignment of the boosting factor to television content may be based on differences between the national boosting factor and the local boosting factors. That is, the assignment may include selecting the national boosting factor as the boosting factor or selecting the local boosting factors as the boosting factors based on the following boosting factor assignment heuristics. For example, as previously described, if the maximum of the local boosting factors is greater than three times the national boosting factor, then the local boosting factors may be assigned to the respective regions (e.g., each TDS 140) as the boosting factor. On the other hand, if the maximum of the local boosting factors is less than or equal to three times the national boosting factor, then the national boosting factor may be assigned to each region (e.g., each TDS 140) as the boosting factor. It will be appreciated that in other implementations, the mathematical relationship between maximum local boosting factors and the national boosting factor may be a value other than three times. That is, the difference may be a value greater than three times or less than three times.

Boosting factors may be selected for television content (block 625). For example, BFA 320 may select the boosting factors for television contents based on results of the applied boosting factor assignment heuristics.

Boosting factors may be published to television distribution sites (block 630). BFP 325 may publish boosting factors 195 to TDSs 140. For example, boosting factor assigner 180 may publish boosting factors 195 via publication server 175 or directly to TDSs 140. BFP 325 may publish boosting factors 195 on a regular basis (e.g., daily or weekly, etc.).

Although FIG. 6 illustrates the exemplary process 600, in other implementations, additional operations, fewer operations, and/or different operations than those illustrated in FIG. 6 and described, may be performed. For example, as previously described, TDSs 140 and/or set top box 110 may utilize the boosting factors when presenting television content to customers (e.g., during a search, browsing, etc.).

Figure 7:
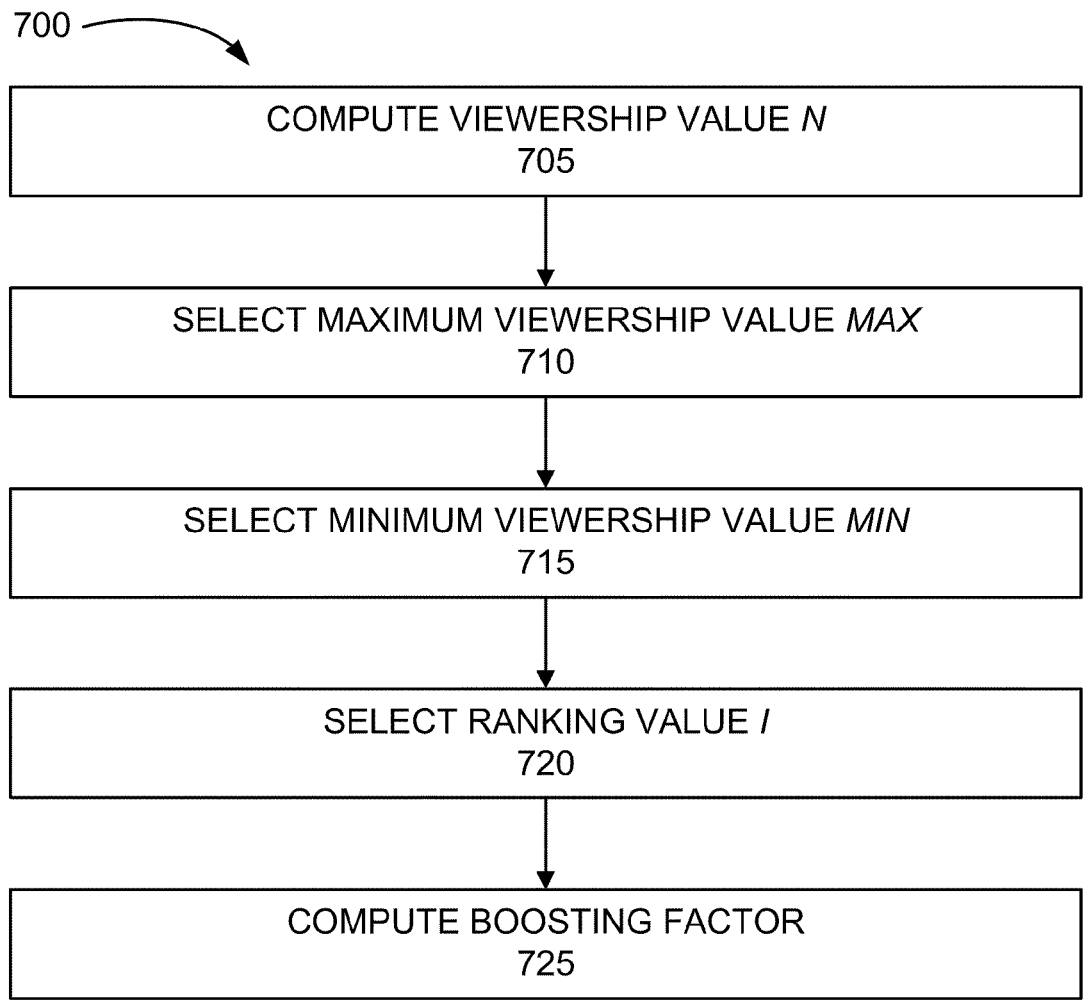
FIG. 7 illustrates a flow diagram of an exemplary process for calculating boosting factors for television content.

FIG. 7 illustrates a flow diagram of an exemplary process 700 for calculating boosting factors for television content. In an exemplary implementation, process 700 may be performed by boosting factor assigner 180. For example, process 700 may be performed as block 615 of process 600.

Process 700 may include computing a viewership value (N) (block 705). For example, VC 305 may calculate (N). (N) may represent the total number of television contents aired and watched by customers. When calculating the national boosting factor, (N) may represent the total number of television contents aired and watched by customers on a national level. The value of (N) may be the same or may be different between TDSs 140.

A maximum viewership value (Max) may be selected (block 710). For example, MMVS 310 may select (Max) values within the local viewership data and the national viewership data (i.e., viewership data 185), respectively. (Max) may represent a maximum viewership of television content.

A minimum viewership value (Min) may be selected (block 715). For example, MMVS 310 may select (Min) values within the local viewership data and the national viewership data (i.e., viewership data 185), respectively. (Min) may represent a minimum viewership of television content.

A ranking value (i) may be selected (block 720). For example, LNBF 315 may select an (i) value for a particular television content. As previously described, (i) may represent a numerical ranking for the particular television content (e.g., television content W) relative to the other television content. The numerical ranking may be based on the viewership associated with the particular television content relative to the other television content.

A boosting factor may be computed (block 725). For example, LNBF 315 may calculate factor according to the following exemplary expression:

$$\frac{(i-1)}{(N-1)} * (\text{Max} - \text{Min}) + (\text{Min}) = \text{factor}. \tag{1}$$

Once the variable factor is calculated, the boosting factor may be calculated according to the following exemplary expression:

$$\text{Math.floor(factor+0.5)=boosting\_factor}. \tag{2}$$

In exemplary implementation, the function Math floor may round down (factor+0.5) to the nearest integer, which may correspond to a local boosting factor or a national boosting factor.

Although FIG. 7 illustrates an exemplary process 700, in other implementations, additional operations, fewer operations, and/or different operations than those illustrated in FIG. 7 and described, may be performed. Additionally, it will be appreciated that process 700 may be an iterative process in which local boosting factors and national boosting factors may be calculated for respective television content.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIG. 6 and FIG. 7, the order of the blocks may be modified in other implementations. Further, non-dependent blocks may be performed in parallel.

It will be apparent that devices, methods, and/or systems, described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
receiving, by a television distribution device, viewership data associated with television contents;
calculating one or more local boosting factors and a national boosting factor for each of the television contents based on the viewership data;
applying boosting factor assignment heuristics to the one or more local boosting factors and the national boosting factor for each of the television contents;
selecting one or more boosting factors based on the applying of the boosting factor assignment heuristics; and
publishing for each of the television contents, the one or more boosting factors to one or more television distribution sites, wherein the boosting factor assignment heuristics include determining whether a maximum value of the one or more local boosting factors is more than a predetermined value that is greater than the national boosting factor.

2. The method of claim 1, wherein the boosting factor assignment heuristics include determining whether the maximum value of the one or more local boosting factors is greater than three times the national boosting factor, and if so, assigning the respective one or more local boosting factors as the one or more boosting factors for a particular television content.

3. The method of claim 1, wherein the boosting factor assignment heuristics include determining whether the maximum value of the one or more local boosting factors is less than or equal to three times the national boosting factor, and if so, assigning the national boosting factor as the one or more boosting factors for a particular television content.

4. The method of claim 1, wherein the viewership data includes local viewership data and national viewership data.

5. The method of claim 4, wherein the calculating comprises:
determining a number of television contents associated with each local viewership data; and
determining a number of television contents associated with the national viewership data.

6. The method of claim 4, wherein the calculating comprises:
determining a maximum value of viewership associated with a particular television content of each local viewership data and of the national viewership data; and
determining a minimum value of viewership associated with a particular television content of each local viewership data and of the national viewership data.

7. The method of claim 1, wherein the one or more boosting factors correspond to a value representing a level of importance of a particular television content relative to other television contents.

8. The method of claim 1, further comprising:
presenting to customers the television contents based on boosting factors when the customers perform a search for television content or browse television content.

9. A network device comprising:
one or more memories to store instructions; and
one or more processors to execute the instructions in the one or more memories to:
receive viewership data associated with television contents;
calculate one or more local boosting factors and a national boosting factor for each of the television contents based on the viewership data, wherein the one or more local boosting factors correspond to one or more values representing a level of importance of a particular television content associated with one or more regional areas of a television distribution system, and the national boosting factor corresponds to a value representing a level of importance of the particular television content relative to an aggregate of the one or more regional areas;
apply boosting factor assignment heuristics to the one or more local boosting factors and the national boosting factor;
select the one or more local boosting factors or the national boosting factor as the level of importance of the particular television content for the one or more regional areas based on the applied boosting factor assignment heuristics; and
forward the one or more local boosting factors or the national boosting factor for the particular television content to one or more television distribution sites associated with the one or more regional areas, wherein the boosting factor assignment heuristics include determining whether a maximum value of the one or more local boosting factors is more than a predetermined value that is greater than the national boosting factor, and if so, selecting the respective one or more local boosting factors for the particular television content.

10. The network device of claim 9, wherein when calculating, the one or more processors are to execute the instructions to:
calculate using the expression $$\frac{(i-1)}{(N-1)} *(\text{Max} - \text{Min}) + (\text{Min}) = \text{factor},$$

wherein (i) corresponds to a ranking value of the particular television content, wherein (N) corresponds to a value indicating a total number of television contents, wherein (Max) corresponds to a value representing viewership of a most-watched television content, and wherein (Min) corresponds to a value representing viewership of a least-watched television content.

11. The network device of claim 9, wherein the viewership data includes one or more local viewership data and national viewership data for each television content, and wherein, when calculating the one or more local boosting factors and the national boosting factor, the one or more processors are to execute the instructions to:

determine a number of television content associated with the one or more local viewership data that is associated with the one or more regional areas; and determine a number of television content associated with the national viewership data.

12. The network device of claim 11, wherein, when calculating the one or more local boosting factors and the national boosting factor, the one or more processors are to execute the instructions to:

determine a maximum value of viewership associated with a particular television content of each local viewership data and of the national viewership data; and determine a minimum value of viewership associated with a particular television content of each local viewership data and of the national viewership data.

13. The network device of claim 11, wherein, when calculating the one or more local boosting factors and the national boosting factor, the one or more processors are to execute the instructions to:

select a ranking value for the particular television content associated with the one or more local boosting factors and the national boosting factor.

14. The network device of claim 11, wherein the one or more local viewership data is received from the one or more television distribution sites.

15. The network device of claim 9, wherein the one or more processors are to execute instructions to:

receive a boosting factor manually entered by a user, wherein the boosting factor corresponds to a value representing a level of importance for a selected television content; and apply the boosting factor to the selected television content; and publish the boosting factor to the one or more television distribution sites.

16. One or more non-transitory computer-readable media containing instructions executable by at least one processor, the one or more non-transitory computer-readable media storing instructions for:

receiving viewership data associated with television contents watched by customers;

calculating one or more local boosting factors and a national boosting factor for each of the television contents, wherein each of the local boosting factors represents a level of importance of a particular television content associated with respective regional areas of a television distribution system, and the national boosting factor represents a level of importance of the particular television content relative to an aggregate of the respective regional areas;

applying boosting factor assignment information to the one or more local boosting factors and the national boosting factor;

selecting the one or more local boosting factors or the national boosting factor associated with the particular television content for the respective regional areas based on an outcome associated with the applying; and publishing the one or more local boosting factors or the national boosting factor associated with the particular television content to one or more television distribution sites associated with respective regional areas, wherein the boosting factor assignment information includes a rule to determine whether a maximum value of the one or more local boosting factors is a predetermined value that is greater than the national boosting factor.

17. The one or more non-transitory computer-readable media of claim 16, wherein the instructions for selecting includes one or more instructions to select the national boosting factor for the respective regional areas when the maximum value of the one or more local boosting factors is not the predetermined value that is greater than the national boosting factor.

18. The one or more non-transitory computer-readable media of claim 16, wherein the instructions for calculating include instructions for utilizing the following expression:

$$\frac{(i-1)}{(N-1)} *(\text{Max} - \text{Min}) + (\text{Min}) = \text{factor},$$

wherein (i) corresponds to a ranking value of the particular television content, wherein (N) corresponds to a value indicating a total number of television contents, wherein (Max) corresponds to a value representing viewership of a most watched television content, and wherein (Min) corresponds to a value representing viewership of a least watched television content.

* * * * *